(12) United States Patent
Miao et al.

(10) Patent No.: US 10,236,999 B2
(45) Date of Patent: Mar. 19, 2019

(54) METHOD, APPARATUS AND COMPUTER PROGRAM FOR ANTENNA CALIBRATION

(71) Applicant: Nokia Solutions and Networks Oy, Espoo (FI)

(72) Inventors: Deshan Miao, Beijing (CN); Jianhong Mou, Beijing (CN); Naizheng Zheng, Beijing (CN); Kari Pekka Pajukoski, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/318,079

(22) PCT Filed: Jun. 13, 2014

(86) PCT No.: PCT/CN2014/079880
§ 371 (c)(1),
(2) Date: Dec. 12, 2016

(87) PCT Pub. No.: WO2015/188386
PCT Pub. Date: Dec. 17, 2015

(65) Prior Publication Data
US 2017/0134105 A1    May 11, 2017

(51) Int. Cl.
*H04B 7/00* (2006.01)
*H04B 17/12* (2015.01)
*H04B 7/06* (2006.01)
*H01Q 3/26* (2006.01)
*H04B 17/309* (2015.01)

(52) U.S. Cl.
CPC ............... *H04B 17/12* (2015.01); *H01Q 3/26* (2013.01); *H04B 7/0617* (2013.01); *H04B 7/0619* (2013.01); *H04B 17/309* (2015.01)

(58) Field of Classification Search
CPC ........ H01Q 3/26; H04B 17/12; H04B 17/309; H04B 7/0617; H04B 7/0619
See application file for complete search history.

(56) References Cited

U.S. PATENT DOCUMENTS

2009/0233545 A1*  9/2009  Sutskover ............... H01Q 3/26
                                                        455/25
2012/0051287 A1*  3/2012  Merlin .................. H04B 7/0617
                                                        375/260
2012/0300864 A1*  11/2012 Merlin .................. H04B 7/0617
                                                        375/260

(Continued)

FOREIGN PATENT DOCUMENTS

CN    102299730 A    12/2011
CN    104025526 A    9/2014

(Continued)

OTHER PUBLICATIONS

International Search Report and Written Opinion received for corresponding Patent Cooperation Treaty Application No. PCT/CN2014/079880, dated Mar. 16, 2015, 13 pages.

*Primary Examiner* — Xin Jia
(74) *Attorney, Agent, or Firm* — Harrington & Smith

(57) ABSTRACT

A method comprises receiving a reference signal from a first node, estimating channel information from said received reference signal, and causing a signal to be transmitted to said first node, said signal comprising a reference signal and information dependent on said channel information.

20 Claims, 9 Drawing Sheets

(56) References Cited

U.S. PATENT DOCUMENTS

| 2015/0249526 A1* | 9/2015 | Kim | H04L 5/0051 |
| | | | 370/329 |
| 2015/0263797 A1* | 9/2015 | Takano | H04B 7/0413 |
| | | | 375/267 |

FOREIGN PATENT DOCUMENTS

| JP | 3877141 B2 | 2/2007 |
| WO | 2012003682 A1 | 1/2012 |

* cited by examiner

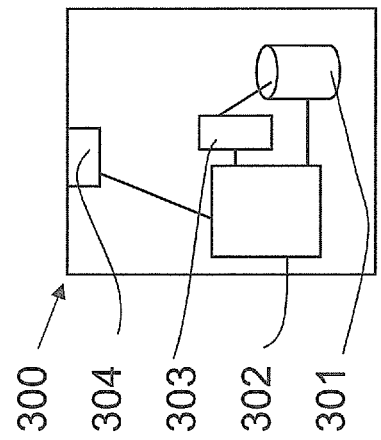
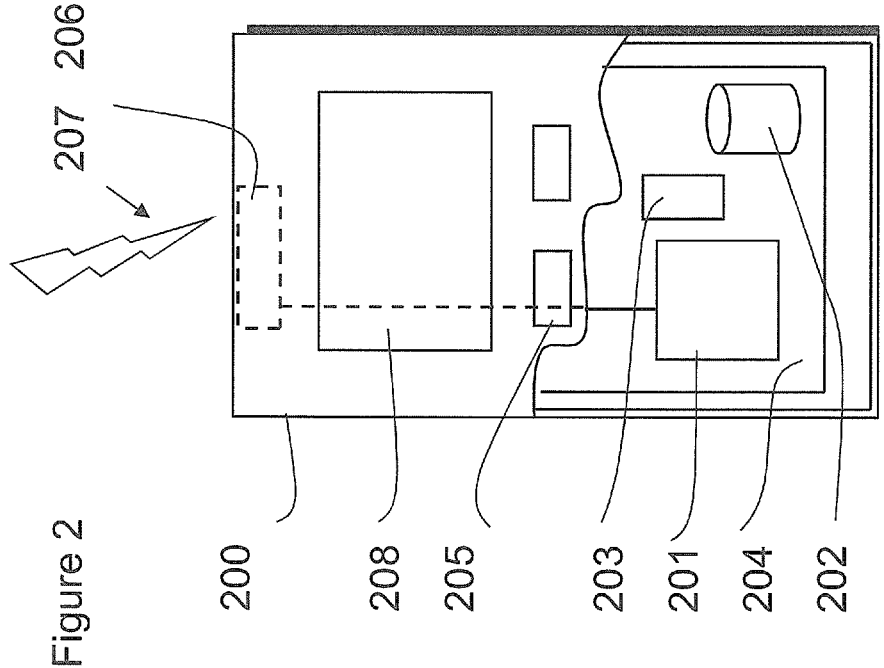

METHOD, APPARATUS AND COMPUTER PROGRAM FOR ANTENNA CALIBRATION

RELATED APPLICATION

This application was originally filed as Patent Cooperation Treaty Application No. PCT/CN2014/079880 filed Jun. 13, 2014.

FIELD

Some embodiments relate to a method, apparatus and computer program, and in particular but not exclusively to a method, apparatus and computer program for antenna calibration.

BACKGROUND

A communication system can be seen as a facility that enables communication sessions between two or more entities such as fixed or mobile communication devices, base stations, servers and/or other communication nodes. A communication system and compatible communicating entities typically operate in accordance with a given standard or specification which sets out what the various entities associated with the system are permitted to do and how that should be achieved. For example, the standards, specifications and related protocols can define the manner how communication devices can access the communication system and how various aspects of communication shall be implemented between communicating devices. A communication can be carried on wired or wireless carriers. In a wireless communication system at least a part of the communication between at least two stations occurs over a wireless link.

Examples of wireless systems include public land mobile networks (PLMN) such as cellular networks, satellite based communication systems and different wireless local networks, for example wireless local area networks (WLAN). A wireless system can be divided into cells, and hence these are often referred to as cellular systems. A cell is provided by a base station. Cells can have different shapes and sizes. A cell can also be divided into sectors. Regardless of the shape and size of the cell providing access for a user equipment, and whether the access is provided via a sector of a cell or a cell, such area can be called radio service area or access area. Neighbouring radio service areas typically overlap, and thus a communication in an area can listen to more than one base station.

A user can access the communication system by means of an appropriate communication device. A communication device of a user is often referred to as user equipment (UE) or terminal. A communication device is provided with an appropriate signal receiving and transmitting arrangement for enabling communications with other parties. Typically a communication device is used for enabling receiving and transmission of communications such as speech and data. In wireless systems a communication device provides a transceiver station that can communicate with another communication device such as e.g. a base station of an access network and/or another user equipment. The communication device may access a carrier provided by a station, for example a base station, and transmit and/or receive communications on the carrier.

Examples of communication systems attempting to satisfy the increased demands for capacity are architectures that are being standardized by the 3rd Generation Partnership Project (3GPP), such as the long-term evolution (LTE), or the Universal Mobile Telecommunications System (UMTS) radio-access technologies. The LTE aims to achieve various improvements, for example reduced latency, higher user data rates, improved system capacity and coverage, reduced cost for the operator and so on. A further development of the LTE is often referred to as LTE-Advanced. The various development stages of the 3GPP LTE specifications are referred to as releases.

In LTE-Advanced the network nodes can be wide area network nodes such as a macro eNodeB (eNB) which may, for example, provide coverage for an entire cell. These may be used with small area network nodes such as Home eNBs (HeNB) (femto cells) or pico eNodeBs (pico-eNB).

In a local area system where there is dense deployment (i.e. multiple access points in a relatively small area), some of the access points (APs) are connected to the network with a wireline connection whereas some other APs may act as relays having only wireless connection (self-backhauling) to the network. The wireline connection may provide X2 or a similar type of connection between the access points. As the deployment is dense, it is likely that some of the access points (if not all) can communicate with each other over the wireless radio channel.

SUMMARY

According to an aspect, there is provided a method comprising: receiving a reference signal from a first node; estimating channel information from said received reference signal; and causing a signal to be transmitted to said first node, said signal comprising a reference signal and information dependent on said channel information.

The method may comprise modulating said reference signal using said information dependent on said channel information.

The signal may be such that calibration information can be determined by the first node based on the received reference signal.

According to another aspect, there is provided a method comprising: causing a reference signal to be sent to a second node; receiving a signal from said second node, said signal comprising a reference signal and information dependent on estimated channel information associated with said reference signal; and using said received signal to determine calibration information.

The received signal may comprise said reference signal modulated by said information dependent on said channel information.

The method may comprise causing an antenna to be controlled in dependence on said channel information. The antenna may be controlled by said calibration information.

The causing may comprise causing a reference signal to be transmitted from an antenna element, said antenna element being controlled in dependence on said transmitted information.

Various of the following features may be used with one or more of the above aspects.

The reference signal may be associated with a network synchronization listening reference signal.

The reference signal may comprise or is based on a network synchronization listening reference signal.

The information dependent on said channel information may comprise an inverse of said estimated channel information.

The information dependent on said channel information may comprise a phase inversion of said estimated channel information.

The calibration information may be for an antenna element.

The calibration information may comprise a calibration coefficient.

According to another aspect, there is provided an apparatus, said apparatus comprising at least one processor and at least one memory including computer code for one or more programs, the at least one memory and the computer code configured, with the at least one processor, to cause the apparatus at least to: receive a reference signal from a first node; estimate channel information from said received reference signal; and cause a signal to be transmitted to said first node, said signal comprising a reference signal and information dependent on said channel information.

The at least one memory and the computer code may be configured, with the at least one processor, to modulate said reference signal using said information dependent on said channel information.

The signal may be such that calibration information can be determined by the first node based on the received reference signal.

The apparatus may be in an access point or a user equipment.

According to another aspect, there is provided an apparatus, said apparatus comprising at least one processor and at least one memory including computer code for one or more programs, the at least one memory and the computer code configured, with the at least one processor, to cause the apparatus at least to: cause a reference signal to be sent to a second node; receive a signal from said second node, said signal comprising a reference signal and information dependent on estimated channel information associated with said reference signal; and use said received signal to determine calibration information.

The received signal may comprise said reference signal modulated by said information dependent on said channel information.

The at least one memory and the computer code may be configured, with the at least one processor, to cause an antenna to be controlled in dependence on said channel information. The antenna may be controlled by said calibration information.

The at least one memory and the computer code may be configured, with the at least one processor, to cause reference signal to be transmitted from an antenna element, said antenna element being controlled in dependence on said transmitted information.

Various of the following features may be used with one or more of the above aspects.

The reference signal may be associated with a network synchronization listening reference signal.

The reference signal may comprise or is based on a network synchronization listening reference signal.

The information dependent on said channel information may comprise an inverse of said estimated channel information.

The information dependent on said channel information may comprise a phase inversion of said estimated channel information.

The calibration information may be for an antenna element.

The calibration information may comprise a calibration coefficient.

The apparatus may be in an access point or a user equipment.

According to an aspect, there is provided an apparatus comprising: means for receiving a reference signal from a first node; means for estimating channel information from said received reference signal; and means causing a signal to be transmitted to said first node, said signal comprising a reference signal and information dependent on said channel information.

The apparatus may comprise means for modulating said reference signal using said information dependent on said channel information.

The signal may be such that calibration information can be determined by the first node based on the received reference signal.

The apparatus may be in an access point or a user equipment.

According to another aspect, there is provided an apparatus comprising: means for causing a reference signal to be sent to a second node; means for receiving a signal from said second node, said signal comprising a reference signal and information dependent on estimated channel information associated with said reference signal; and means for using said received signal to determine calibration information.

The received signal may comprise said reference signal modulated by said information dependent on said channel information.

The apparatus may comprise means for causing an antenna to be controlled in dependence on said channel information. The antenna may be controlled by said calibration information.

The means for causing may cause a reference signal to be transmitted from an antenna element, said antenna element being controlled in dependence on said transmitted information.

The reference signal may be associated with a network synchronization listening reference signal.

The reference signal may comprise or is based on a network synchronization listening reference signal.

The information dependent on said channel information may comprise an inverse of said estimated channel information.

The information dependent on said channel information may comprise a phase inversion of said estimated channel information.

The calibration information may be for an antenna element.

The calibration information may comprise a calibration coefficient.

The apparatus may be in a user equipment or an access point.

In the above, the first node may be an access point or a user equipment.

In the above, the second node may be an access point or a user equipment.

A computer program comprising program code means adapted to perform the herein described methods may also be provided. In accordance with further embodiments apparatus and/or computer program product that can be embodied on a computer readable medium for providing at least one of the above methods is provided.

It should be appreciated that any feature of any aspect may be combined with any other feature of any other aspect.

BRIEF DESCRIPTION OF DRAWINGS

Some embodiments will now be described by way of example only with reference to the following Figures in which:

FIG. 2 shows a schematic diagram of a communication device according to some embodiments;

FIG. 3 shows a schematic diagram of a control apparatus according to some embodiments;

DETAILED DESCRIPTION

In the following certain exemplifying embodiments are explained with reference to a wireless or mobile communication system serving communication devices. Before explaining in detail the exemplifying embodiments, certain general principles of a wireless communication system, access systems thereof, and communication devices are briefly explained with reference to FIGS. 1 to 3 to assist in understanding the technology underlying the described examples.

Figure 1:
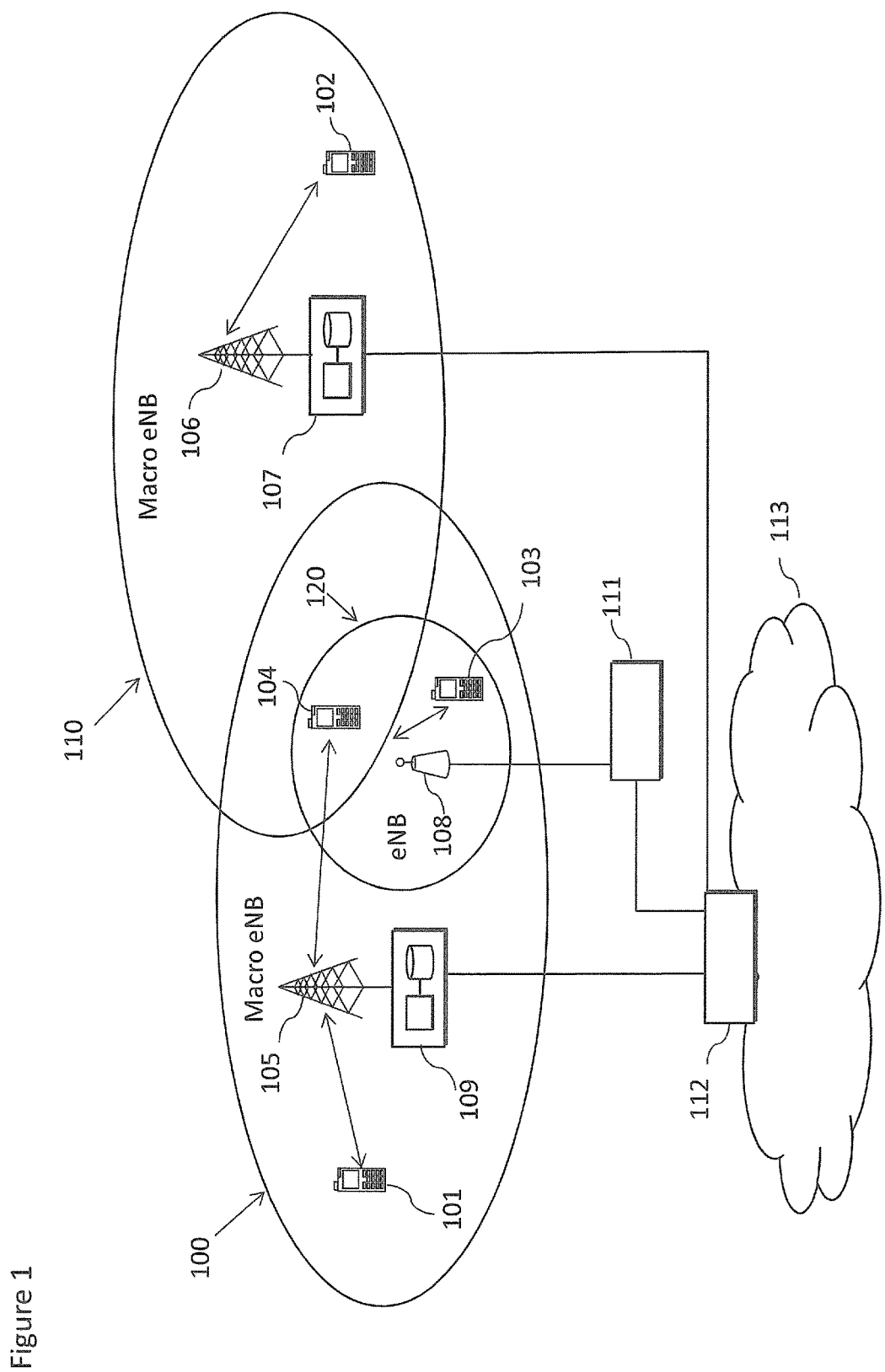
FIG. 1 shows a schematic diagram of a network according to some embodiments.

A communication device or user equipment 101, 102, 103, 104 is typically provided wireless access via at least one base station or similar wireless transmitter and/or receiver node of an access system. In FIG. 1 three neighbouring and overlapping access systems or radio service areas 100, 110 and 120 are shown being provided by base stations 105, 106, and 108.

However, it is noted that instead of three access systems, any number of access systems can be provided in a communication system. An access system can be provided by a cell of a cellular system or another system enabling a communication device to access a communication system. A base station site 105, 106, 108 can provide one or more cells. A base station can also provide a plurality of sectors, for example three radio sectors, each sector providing a cell or a subarea of a cell. All sectors within a cell can be served by the same base station. A radio link within a sector can be identified by a single logical identification belonging to that sector. Thus a base station can provide one or more radio service areas. Each communication device 101, 102, 103, 104, and base station 105, 106, and 108 may have one or more radio channels open at the same time and may send signals to and/or receive signals from more than one source.

Base stations 105, 106, 108 are typically controlled by at least one appropriate controller apparatus 109, 107 so as to enable operation thereof and management of communication devices 101, 102, 103, 104 in communication with the base stations 105, 106, 108. The control apparatus 107, 109 can be interconnected with other control entities. The control apparatus 109 can typically be provided with memory capacity 301 and at least one data processor 302. The control apparatus 109 and functions may be distributed between a plurality of control units. Although not shown in FIG. 1, in some embodiments each base station 105, 106 and 108 can comprise a control apparatus 109, 107.

The cell borders or edges are schematically shown for illustration purposes only in FIG. 1. It shall be understood that the sizes and shapes of the cells or other radio service areas may vary considerably from the similarly sized omnidirectional shapes of FIG. 1.

In particular, FIG. 1 depicts two wide area base stations 105, 106, which can be macro-eNBs 105, 106 in an LTE system. The macro-eNBs 105, 106 transmit and receive data over the entire coverage of the cells 100 and 110 respectively. FIG. 1 also shows a smaller area base station or access point which in some embodiments can be a pico, a femto or Home eNB 108. The coverage of the smaller area base station 108 is generally smaller than the coverage of the wide area base stations 105, 106. The coverage provided by the smaller area node 108 overlaps with the coverage provided by the macro-eNBs 105, 106. Smaller cell eNBs can be used to extend coverage of the macro-eNBs 105, 106 outside the original cell coverage 100, 110 of the macro-eNBs 105, 106. The smaller cell eNB can also be used to provide cell coverage in "gaps" or "shadows" where there is no coverage within the existing cells 100, 110 and/or may serve "hot spots". In some embodiments, the smaller area node can be a femto or Home eNB which can provide coverage for a relatively small area such as the home or a pico eNB. Some environments may have both pico and femto cells.

As shown, the radio service areas can overlap. Thus signals transmitted in an area can interfere with communications in another area (macro to macro, pico/femto to either one or both of the macro cells, and/or pico/femto to pico/femto).

The communication devices 101, 102, 103, 104 can access the communication system based on various access techniques, such as code division multiple access (CDMA), or wideband CDMA (WCDMA). Other examples include time division multiple access (TDMA), frequency division multiple access (FDMA) and various schemes thereof such as the interleaved frequency division multiple access (IFDMA), single carrier frequency division multiple access (SC-FDMA) and orthogonal frequency division multiple access (OFDMA), space division multiple access (SDMA) and so on.

Some non-limiting examples of the recent developments in communication systems are the long-term evolution (LTE) of the Universal Mobile Telecommunications System (UMTS) that is being standardized by the 3rd Generation Partnership Project (3GPP). As explained above, further development of the LTE is referred to as LTE-Advanced. Non-limiting examples of appropriate access nodes are a base station of a cellular system, for example what is known as NodeB (NB) in the vocabulary of the 3GPP specifications. The LTE employs a mobile architecture known as the Evolved Universal Terrestrial Radio Access Network (E-UTRAN). Base stations of such systems are known as evolved Node Bs (eNBs) and may provide E-UTRAN features such as user plane Radio Link Control/Medium Access Control/Physical layer protocol (RLC/MAC/PHY) and control plane Radio Resource Control (RRC) protocol terminations towards the user devices. Other examples of radio access systems include those provided by base stations of systems that are based on technologies such as wireless local area network (WLAN) and/or WiMax (Worldwide Interoperability for Microwave Access). Fifth Generation (5G) radio systems may be commercially available around 2020.

In FIG. 1 the base stations 105, 106, 108 of the access systems can be connected to a wider communications network 113. A controller apparatus 107, 109 may be provided for coordinating the operation of the access systems. A gateway function 112 may also be provided to connect to another network via the network 113. The smaller area base station 108 can also be connected to the other network by a separate gateway function 111. The base stations 105, 106, 108 can be connected to each other by a communication link for sending and receiving data. The communication link can be any suitable means for sending and receiving data between the base stations 105, 106 and 108 and in some embodiments the communication link is an X2 link.

The other network may be any appropriate network. A wider communication system may thus be provided by one or more interconnect networks and the elements thereof, and one or more gateways may be provided for interconnecting various networks.

The communication devices will now be described in more detail with reference to FIG. 2. FIG. 2 shows a schematic, partially sectioned view of a communication device 101 that a user can use for communication. Of course the other communication devices shown in FIG. 1 may have the same or similar features. Such a communication device is often referred to as user equipment (UE) or terminal. An appropriate communication device may be provided by any device capable of sending and receiving radio signals. The communication device may be mobile or may be generally stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, a computer or any combinations of these or the like.

A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The device 101 may receive signals over an air interface 207 via appropriate apparatus for receiving and may transmit signals via appropriate apparatus for transmitting radio signals.

In FIG. 2 transceiver apparatus is designated schematically by block 206. The transceiver apparatus 206 may be provided for example by means of a radio part and associated antenna arrangement. The antenna arrangement may be arranged internally or externally to the communication device.

The communication device is also typically provided with at least one data processing entity 201, at least one memory 202 and other possible components 203 for use in software and hardware aided execution of tasks it is designed to perform, including control of access to and communications with access systems and other communication devices. The data processing, storage and other relevant control apparatus can be provided on an appropriate circuit board and/or in chipsets. This feature is denoted by reference 204.

The user may control the operation of the communication device by means of a suitable user interface such as key pad 205, voice commands, touch sensitive screen or pad, combinations thereof or the like. A display 208, a speaker and a microphone can be also provided. Furthermore, a communication device may comprise appropriate connectors (either wired or wireless) to other devices and/or for connecting external accessories, for example hands-free equipment, thereto.

Some embodiment maybe used in so called Fifth Generation (5G) radio systems. However, it should be appreciated that other embodiments may be used with other radio systems such as one or more current radio systems and/or other future systems. For example, some embodiments may be provided in a LTE system Some embodiments may be used in local area networks, for example where there is dense deployment. Access points may be provided. These access points may be base stations or any other suitable access points.

Some embodiments may be used in a time division duplexing (TDD) system. In a TDD system the radio channel may be reciprocal, meaning that ideally, transmit and receive channels are the same within the limits of the channel coherence time. Therefore, some transmission techniques (such as precoding and/or frequency dependent scheduling) that usually require assistance from the receiving device can be applied in a way that the transmission parameters are calculated at the transmitting device according to the measurements made from the received signal.

In TDD systems the reciprocity property of the radio channel can be exploited, for example in transmit beamforming. Beamforming is a signal processing technique used for directional signal transmission or reception. Channel State Information (CSI) may be calculated from the received signal and, using the reciprocity principle, transmit beamforming weights can be calculated from the CSI. The beam forming weights control the signal provided to each individual antenna element to control the direction in which the beam is formed. In practice the receiver and transmitter chains (the electronic components making up the receiver and the transmitter) are not identical, and this difference may be compensated by a procedure referred to as antenna calibration.

In a typical calibration procedure, differences between the transmitter and receiver chains are calculated and can be compensated with calibration coefficients. In order to calculate the calibration coefficients the transmitter to be calibrated usually needs estimates of the received signals along with CSI measured from a transmitted reference signal that is fed back from another assisting device. To enable good performance the CSI feedback is preferably of high accuracy. Therefore in practice the estimations may be integrated over a period of time, and the amount of data to be fed back from the assisting device may be large. For instance, an eNB may select a UE to assist it to complete a calibration, as shown in 3GPP R1-080494.

Figure 4:
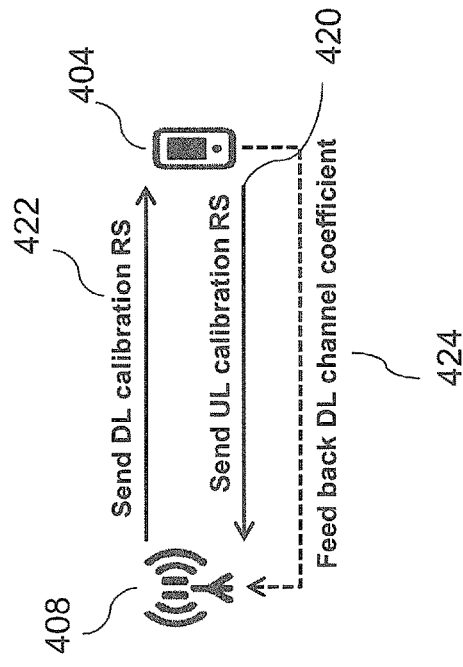
FIG. 4 shows an example of UE assisted AP calibration.

FIG. 4 shows some steps of antenna calibration. An access point 408 is in communication with a UE 404. As shown at 420, the UE 404 sends uplink (UL) calibration reference signals (RS) to the AP 408. As shown at 422, the AP 408 sends downlink (DL) RS to the UE 404. The UE can then compare the UL calibration RS with the DL calibration RS, and calculate and feedback the DL channel coefficient to the AP 408, as shown at 424.

This is discussed in more detail below. A transmit mismatch for an AP antenna i is denoted by $\tau_i$. A receive mismatch for antenna i in the AP is denoted by $\rho_i$. An effective mismatch ($\beta_i$) for each antenna i is denoted by:

$$\beta_i = \tau_i / \rho_i$$

On the UE side the transmit mismatch is denoted by $\sigma_j$. The receive mismatch is denoted by $\pi_i$. An effective mismatch for each UE ($\alpha_i$) can then be defined as:

$$\alpha_i = \pi_i / \sigma_i$$

In a first step, an effective channel from an $i^{th}$ AP antenna to a $j^{th}$ UE can be estimated.

Then, an effective channel from the $j^{th}$ UE to the $i^{th}$ AP antenna can be estimated. The effective channel is the channel conditions present in the channel between the respective UE and AP antennas.

Then, by the reciprocity of the channel, an effective calibration factor ($c_{ij}$) for the AP antenna i to the $j^{th}$ UE can be estimated using the following equation:

$$\tau_i h^D_{ij} \pi_j / \sigma_i h^U_{ji} \rho_j = \beta_i \alpha_j$$

where h is the channel impulse response and D=downlink and U=uplink

An effective calibration vector C for the AP can then be denoted by:

$$C = (c_1, c_2, c_M)$$

Then, for UE antenna element j, the calibration vector is given by:

$$C_j = (\beta_1 \alpha_1, \beta_1 \alpha_1, \ldots, \beta_M \alpha_1)$$

In some cases, it is only necessary to calibrate the eNB up to a scaling constant, and therefore:

$$C_j / \beta_1 \alpha_1 = (\beta_1 \alpha_1 / \beta_1 \alpha_1, \beta_2 \alpha_1 / \beta_1 \alpha_1, \ldots, \beta_M \alpha_1 / \beta_1 \alpha_1) = (1, \beta_2/\beta_1, \ldots, \beta_M/\beta_1)$$

The calibration procedure proposed for IEEE 802.11n uses the basic principle of transmitting reference signals to the assisting device, measuring them, and feeding back the CSI to the device to be calibrated. However, a disadvantage of the method proposed in IEEE 802.11n may be that the amount of data to be fed back from the assisting device is high compared to the capability of the system. The CSI estimation accuracy may be poor due the fact that the measurement is made using only one reference sequence. This method may suffer from a residual calibration error that is caused by the non-calibrated transmitter and receiver chains in the assisting device.

AP to AP network side calibration may be provided, where an AP performs the calibration with another AP over the air interface. This may also be extended to a situation where a cluster of APs performs calibration with another cluster of APs.

Figure 5:
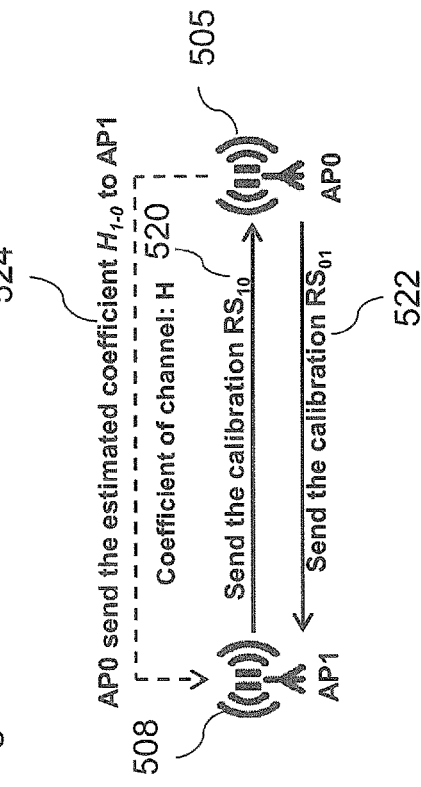
FIG. 5 shows an example of inter-AP calibration.

This method is discussed in more detail below, with respect to FIG. 5. In the following, it is assumed that AP0 505 has implemented the calibration, and AP1 508 is to be calibrated. Also, the coefficient of Tx RF chain for AP1 508 is represented by $\alpha_{Tx}$, the coefficient of Rx RF chain for AP1 508 is $\alpha_{Rx}$, the coefficient of Tx RF chain for AP0 505 is $\beta_{Tx}$, and the coefficient of Rx RF chain for AP0 505 is $\beta_{Rx}$.

Initially, AP1 508 sends the calibration reference signals ($RS_{10}$) to AP0 505, as shown at 520.

Then, the AP0 505 estimates the channel coefficients $H_{1-0}$ based on $RS_{10}$, using the equation:

$$H_{1-0} = \alpha_{Tx} \cdot H \cdot \beta_{Rx}$$

The AP0 505 can then feedback the measured channel coefficient $H_{1-0}$ to AP1 508 as shown at 524, and sends the calibration $RS_{01}$ to AP1 508, as shown at 522.

AP1 508 then estimates the channel coefficients $H_{0-1}$ based on $RS_{01}$ from AP0 505, using the equation:

$$H_{0-1} = \beta_{Tx} \cdot H \cdot \alpha_{Rx}$$

and together with the received channel coefficient $H_{1-0}$, AP1 508 is able to calculate the calibration factor. The expected calibration factor can be expressed as:

$$\frac{H_{0-1}}{H_{1-0}} = \frac{\beta_{Tx} \cdot H \cdot \alpha_{Rx}}{\alpha_{Tx} \cdot H \cdot \beta_{Rx}} = \frac{\beta_{Tx}}{\beta_{Rx}} \cdot \frac{\alpha_{Rx}}{\alpha_{Tx}} = \gamma \Rightarrow \gamma \cdot \frac{\alpha_{Tx}}{\alpha_{Rx}} = \frac{\beta_{Tx}}{\beta_{Rx}}$$

where $$v = \frac{\beta_{Tx}}{\beta_{Rx}}$$

is TX/RX RF chain ratio of AP0 that has been calibrated, and a calibration target is to let TX/RX RF chain factor of AP1 508 to be equal to the TX/RX RF chain ratio of AP0 505.

The above methods require the assisted device or assisted AP to quantize the received signal and forward them to the calibrating AP. This may burden the backhaul link or the air interface. The methods may require standardization effort to define how to quantize and specify related transmitting protocol.

Some embodiments provide network calibration methods. The methods may optimize the calibration procedure of air interface.

In some embodiments, the reference signal is used to carry a calibration variable instead of quantizing channel coefficients and returning back. As will be discussed in more detail below the calibration variable may be the inverse of a channel coefficient, or phase inverse of a channel coefficient. In this manner the calibration variable may be used to obtain the calibration coefficient. In some embodiments, the calibration variable may be the calibration coefficient.

In some embodiments, the reference signal is used to carry the inverse of the estimated channel coefficient. In some embodiments the reference signal is modulated by the inverse of the estimated channel coefficient.

In some embodiments, the reference signal is modulated only by the phase inversion of estimated channel coefficient.

In the following, the examples are assumed as one antenna port, because the calibration reference signals for different ports would be transmitted on orthogonal resources (i.e. the reference signals are transmitted in different frequency domain, time domain, code domain, etc.), for each port. The corresponding reference signal would be received dedicatedly, and each port may perform the same procedure.

Figure 6:
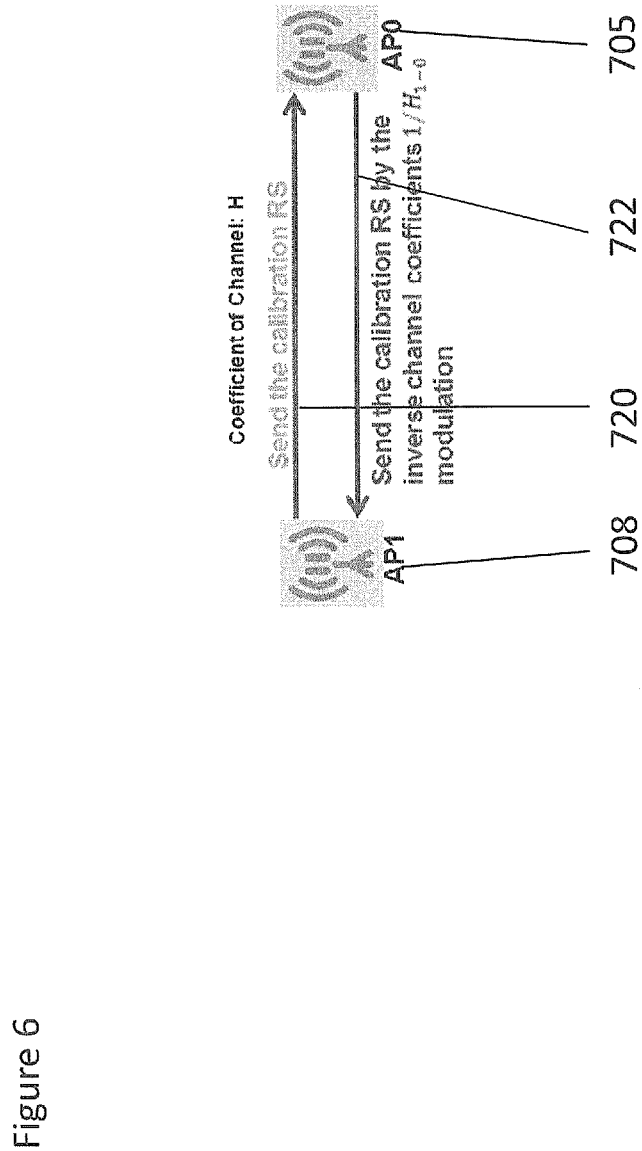
FIG. 6 shows an example of inter-AP calibration according to an embodiment.
Figure 7:
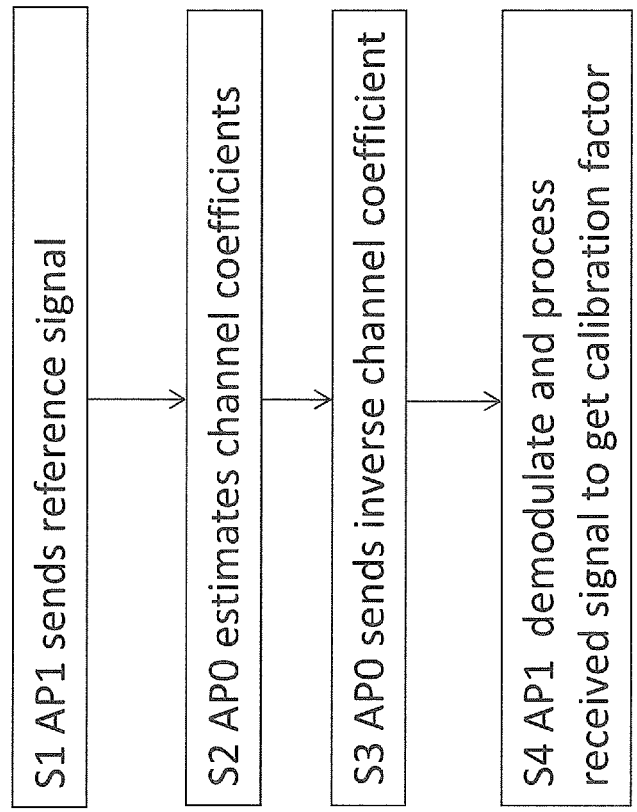
FIG. 7 shows a flow diagram of a method of an embodiment.

Reference is now made to FIGS. 6 and 7 which shows an example of antenna calibration through inverse channel coefficient modulation.

The antenna calibration can be conducted in following steps, taking a single port as an example, assuming the RS sequence element is equal to 1.

In step S1, the AP1 708 sends the calibration reference signals ($RS_{10}$), as shown at 720 to the AP0 705.

In step S2, the AP0 705 estimates the channel coefficients $H_{1-0}$ based on the calibration reference $RS_{10}$. $H_{1-0}$ is a channel coefficient including TX and RX chain coefficients with per subcarrier basis. In some embodiments the channel coefficient is used to represent a channel characterstic of the signal transmission path, including the RF part and wireless part. In principle, this channel coefficient may be equal to channel information or channel response of the whole transmission path.

In step S3, the AP0 705 sends the inverse channel coefficient ($1/H_{1-0}$) to AP1 via the air interface, e.g. the information transmission can be conveyed by $RS_{01}$, as shown at 722. The inverse channel coefficient will directly modulate the calibration RS on the RS sequence which is sent by the second access point AP0 to the first access point AP1. Using the inverse of the channel coefficient may reduce processing complexity in obtaining the calibration coefficient. In other embodiments the channel could be transformed in a manner that does not use the inversion technique.

In step S4, the first access point will demodulate the received signals. After demodulating, the complete baseband signals received by the first access point AP1 area as follows:

$$R'_{0-1} = \frac{1}{H_{1-0}} \cdot RS \cdot \beta_{Tx} \cdot H \cdot \alpha_{Rx} = RS \cdot \frac{\beta_{Tx}}{\beta_{Rx}} \cdot \frac{\alpha_{Rx}}{\alpha_{Tx}}$$

The above equation demonstrates the use of inversion. Other channel coefficient transformations may not be as effective but none the less may have other advantages.

Because the calibration RS is known the calibration signal RS can be removed. After removing the calibration signal, the received baseband signals will be:

$$R_{0-1} = \frac{R'_{0-1}}{RS} = \frac{\beta_{Tx}}{\beta_{Rx}} \cdot \frac{\alpha_{Rx}}{\alpha_{Tx}}$$

So for AP1, the calibration factor is equal to $$\gamma = R_{0-1}$$
$$\Longleftrightarrow \left(\gamma \cdot \frac{\alpha_{Tx}}{\alpha_{Rx}} = \frac{\beta_{Tx}}{\beta_{Rx}}\right)$$

Figure 8:
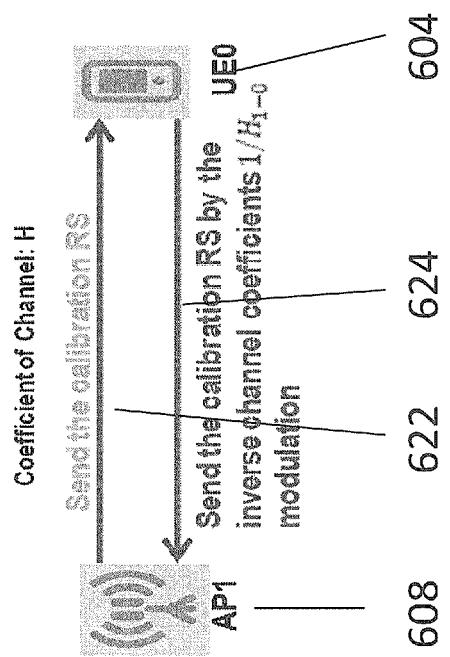
FIG. 8 shows an example of UE assisted calibration according to a embodiment.
Figure 9:
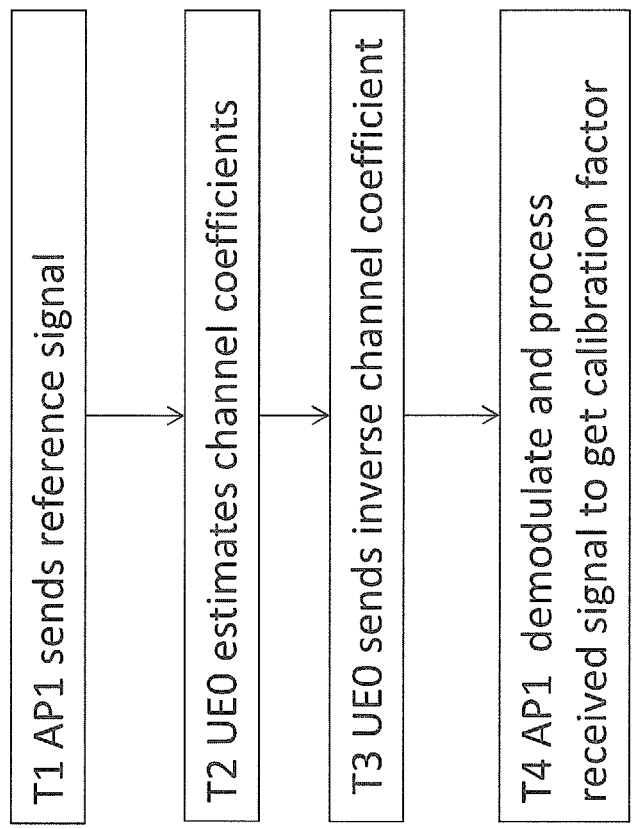
FIG. 9 shows a flow diagram of a method of an embodiment.

The above example is associated with AP to AP direct calibration. Reference is now made to FIGS. 8 and 9 which show UE assisted calibration. In this embodiment, the inverse coefficient transmission technique may also be used, in the embodiment, the SRS (sounding reference signal) is modulated with the inverse channel coefficient.

In step T1, the AP1 608 sends the calibration reference signals RS to the UE0 605, as shown by 620.

At step T2, the UE0 605 estimates the channel coefficients based on the calibration RS.

In step T3, the UE0 605 sends a calibration RS modulated by the inverse channel coefficient to AP1 through the aft interface as shown by reference 622. This calibration RS may be the SRS or a different reference signal.

In step T4, the AP1 605 derives the calibration vector according to received signal as described previously.

In some embodiments, phase inversion modulation may be used. With the inverse channel coefficient transmission, this modulation on the calibration RS may cause the RS transmission power to be outside of the permitted tolerance, in this sense, it may be required to specify one upper and one lower limit, to clip the extreme value. For example, if the receiver power is quite low, e.g. 0.01, then the inverse is equal to 100, and the value may exceed the upper limit of a tolerable transmission signal. Therefore this extreme value may need to be dipped.

Generally, the RF chain will attenuate transmitting RS signal. After passing through a fading wireless channel, the received channel coefficient may be small, which results in a larger inverse signal. The inverse coefficient modulation may be operating as a PS power boost. However, if the upper power limit is exceeded, the clipping may make the one-step compensation difficult. However, by repeating the calibration procedure, for each step, one limited amplitude compensation can be applied, and finally the overall amplitude compensation may be converged and completed.

As one alternative, the channel coefficient may be split into two parts, one being phase, another being amplitude. Therefore, the inverted phase may be transmitted with the calibration RS, and the amplitude part could be quantized, and fed back to calibrating AR.

It is to be noted that ampltitude inversion may cause an extreme value out of the tolerable range. Therefore phase inversion is used, since this is generally not considered problematic with respect to extreme values. For example the inversion of phase may always be in the range of (0.2pi).

In this arrangement the assisting AP0 or assisting UE does not need to feed back the estimated channel coefficients of the calibrating AF1. This may be advantageous where the backhaul interface is not available. For example, in a local small cell scenario, the mobile operator does not always have the backhaul interface available for all the small cell APs. Therefore, the antenna calibration solution which relies on the assisting AP0 feedback, (which is generally carried via the network backhaul interface, e.g. the X2-interface in LTE network), might not be feasible. In some embodiments, the antenna calibration may be carried out solely through the air-interface.

In the above, the examples are assumed as one port, because the calibration reference signals for different ports would be transmitted on orthogonal resources (i.e. the reference signals are transmitted in different frequency domain, time domain, code domain, etc.), for each port. The corresponding reference signal would be received dedicatedly, and each port would perform the same procedure. The antenna calibration reference signal design for multiple ports will now be discussed.

Alternate transmitting calibration RS from different TX ports may be provided by reusing legacy synchronization listening RS in different TTIs (transmission time intervals or different subbands).

Figure 10:
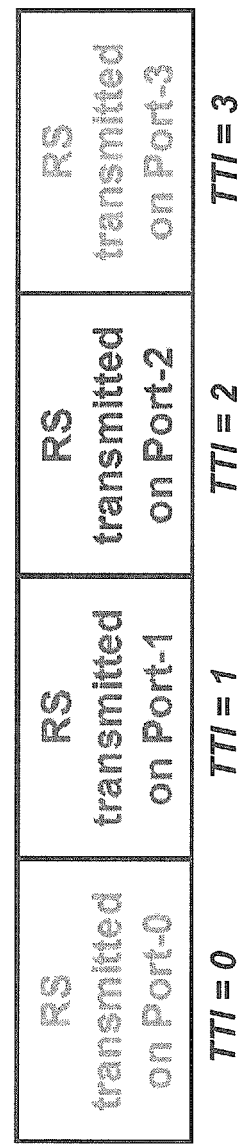
FIG. 10 shows calibration reference signals transmitted separately in the time domain.

The legacy CRS port 0, which may be a synchronization listening RS in some systems, is reused as a calibration reference signal, where in FIG. 10 the CRS is alternatively transmitted on different TX ports in different TTI, i.e. in TTI-0, the CRS is transmitted from antenna port-0, and in TTI-1, the CRS is transmitted on antenna port-1. Normally CRS port 0 will be transmitted in antenna port 0 fixedly, which means the receiver always assumes the reference signal is transmitted from antenna port 0. In some embodiments this is extended, and the CRS port 0 signal could be transmitted from multiple antenna ports from the time domain or frequency domain in a shifting manner. The receiver may know from which antenna port the transmitted signal is from, in some embodiments. In embodiments the RS pattern or RS configuration is not changed, but the RS is enabled to transmit in a different physical antenna port. Normally the legacy synchronization listening RS will be allowed to transmit from one antenna port, but in embodiments the legacy RS is re-used without defining multiple RS ports to meet multiple-antenna calibration requirements.

Figure 11:
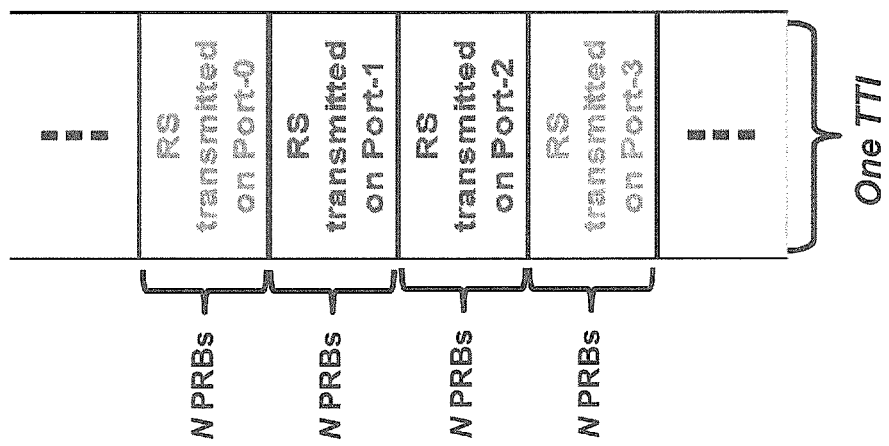
FIG. 11 shows calibration reference signal transmitted separately in the frequency domain.

FIG. 11 shows frequency shift of multiple TX port RS transmission. In this embodiment, in one TTI, different PRB (physical resource blocks) are used to transmit respective reference signals from the different port.

The calibration method and/or apparatus of some embodiments may have one or more of the following advantages:
- no need to quantize and transmit the channel coefficient back to the calibrating access point through the backhaul;
- fast and simple calibration with air interface may be provided without needing a complex standardization process; and
- some embodiments may reuse legacy synchronization RS to realize network calibration.

The calibrating device performs antenna calibration using the calibration factor.

FIG. 3 shows an example of a control apparatus 300. In some embodiments the control apparatus is provided in the access point. For this purpose the control apparatus comprises at least one memory 301, at least one data processing unit 302, 303 and an input/output interface 304. Via the interface the control apparatus can be coupled to a receiver and a transmitter of the access point. The control apparatus can be configured to execute an appropriate software code to provide the control functions.

In embodiments where an X2 interface is available between the APs, then the X2 interface is used. In other embodiments, the air interface may be used for signalling between access points.

It should be appreciated that in the above, first node may be used additionally or alternatively to calibrate the second node (UE or AP). It should be appreciated that some embodiments may be used to calibrate one or more of a pair of any suitable nodes.

It is also noted herein that while the above describes exemplifying embodiments of the invention, there are several variations and modifications which may be made to the disclosed solution without departing from the scope of the present invention.

The required data processing apparatus and functions of an access point, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Some embodiments may be implemented by computer software executable by a data processor of the communication device, such as in the processor entity, or by hardware, or by a combination of software and hardware.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

What is claimed is:

1. A method comprising:
   receiving by an access node, an uplink calibration reference signal from a first node;
   estimating, by the access node, channel information from said received uplink calibration reference signal; and
   causing, by the access node, a signal to be transmitted to said first node, said signal comprising a downlink reference signal and information dependent on said channel information, wherein the signal is such that calibration information can be determined by the first node based on a comparison of the downlink reference signal and the uplink calibration reference signal, together with the information dependent on said channel information, wherein the calibration information comprises a reuse of legacy synchronization calibration reference signals.

2. The method of claim 1, comprising modulating said uplink reference signal using said information dependent on said channel information.

3. The method of claim 1, wherein the first node is embodied in one of a user equipment and another access node.

4. The method of claim 3, wherein said calibration information is for an antenna element.

5. The method of claim 3, wherein said calibration information comprises a calibration coefficient.

6. The method of claim 1, wherein the reference signal is associated with a network synchronization listening reference signal, and wherein the legacy synchronization calibration reference signals are reused in different transmission time intervals or different subbands, and without defining multiple reference signal ports to meet multiple-antenna calibration requirements.

7. The method of claim 1, wherein said information dependent on said channel information comprises an inverse of said estimated channel information.

8. The method of claim 1, wherein said information dependent on said channel information comprises a phase inversion of said estimated channel information.

9. An apparatus, said apparatus comprising at least one processor and at least one memory including computer code for one or more programs, the at least one memory and the computer code configured, with the at least one processor, to cause the apparatus at least to:
receive an uplink calibration reference signal from a first node;
estimate channel information from said received uplink calibration reference signal; and
cause a signal to be transmitted to said first node, said signal comprising a downlink reference signal and information dependent on said channel information, wherein the signal is such that calibration information can be determined by the first node based on a comparison of the downlink reference signal and the uplink calibration reference signal, together with the information dependent on said channel information, wherein the calibration information comprises a reuse of legacy synchronization calibration reference signals.

10. The apparatus of claim 9, wherein the at least one memory and the computer code are configured, with the at least one processor, to modulate said uplink reference signal using said information dependent on said channel information.

11. The apparatus of claim 9, wherein the first node is embodied in in one of a user equipment and an access node.

12. An apparatus, said apparatus comprising at least one processor and at least one memory including computer code for one or more programs, the at least one memory and the computer code configured, with the at least one processor, to cause the apparatus at least to:
cause an uplink calibration reference signal to be sent to a second node;
receive a signal from said second node, said signal comprising a downlink reference signal and information dependent on estimated channel information associated with said downlink reference signal; and
use a comparison of the downlink reference signal and the uplink calibration reference signal, together with the information dependent on said channel information of said received signal to determine calibration information, wherein the calibration information comprises a reuse of legacy synchronization calibration reference signals.

13. The apparatus of claim 12, wherein the received signal comprises said uplink calibration reference signal modulated by said information dependent on said channel information.

14. The apparatus of claim 12, wherein the at least one memory and the computer code are configured, with the at least one processor, to cause an antenna to be controlled in dependence on said channel information.

15. The apparatus of claim 14, wherein the at least one memory and the computer code are configured, with the at least one processor, to cause a reference signal to be transmitted from an antenna element, said antenna element being controlled in dependence on said transmitted information.

16. The apparatus of claim 14, wherein the reference signal is associated with a network synchronization listening reference signal, and, wherein the legacy synchronization calibration reference signals are reused in different transmission time intervals or different subbands, and without defining multiple reference signal ports to meet multiple-antenna calibration requirements.

17. The apparatus of claim 12, wherein the information dependent on said channel information comprises an inverse of said estimated channel information.

18. The apparatus of claim 12, wherein the information dependent on said channel information comprises a phase inversion of said estimated channel information.

19. The apparatus of claim 12, wherein the calibration information is for an antenna element.

20. The apparatus of claim 12, wherein the calibration information comprises a calibration coefficient.

* * * * *